US007646805B2

(12) United States Patent
Cho

(10) Patent No.: US 7,646,805 B2
(45) Date of Patent: Jan. 12, 2010

(54) DIGITAL BROADCASTING RECEIVING TERMINAL WITH RECEPTION QUALITY INDICATOR

(75) Inventor: Nam Shin Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 577 days.

(21) Appl. No.: 11/413,996

(22) Filed: Apr. 28, 2006

(65) Prior Publication Data

US 2006/0248412 A1 Nov. 2, 2006

(30) Foreign Application Priority Data

Apr. 29, 2005 (KR) ...................... 10-2005-0035941

(51) Int. Cl.
*H04B 3/46* (2006.01)
*H04B 17/00* (2006.01)
*H04Q 1/20* (2006.01)

(52) U.S. Cl. ....................... 375/228; 375/225; 375/227; 375/262; 375/341; 375/346

(58) Field of Classification Search ................. 375/262, 375/228, 225, 227, 341, 346, 260; 455/231.1; 348/570

See application file for complete search history.

(56) References Cited

U.S. PATENT DOCUMENTS 5,966,186 A * 10/1999 Shigihara et al. ............ 348/570
6,363,245 B1 * 3/2002 Natori ..................... 455/226.3
6,650,878 B1 * 11/2003 Abe et al. ................ 455/232.1

FOREIGN PATENT DOCUMENTS

| | | | |
|---|---|---|---|
| EP | 0 818 923 | A2 | 1/1998 |
| EP | 0 818 923 | A3 | 8/1998 |
| EP | 1 089 429 | A2 | 4/2001 |
| EP | 1 089 429 | A3 | 11/2003 |
| JP | 2002-101006 | | 4/2002 |
| JP | 2005-086386 | | 3/2005 |
| KR | 1999-0052289 | | 7/1999 |
| WO | WO 2004-066511 | A2 | 8/2004 |
| WO | WO 2004/082198 | A1 | 9/2004 |

* cited by examiner

*Primary Examiner*—Phuong Phu
(74) *Attorney, Agent, or Firm*—Lee, Hong, Degerman, Kang & Waimey

(57) ABSTRACT

A terminal for receiving digital broadcast signals includes signal receiving components for receiving a digital broadcast signal, and a first error rate detection unit for detecting a first bit error rate (BER) of the digital broadcast signal before the digital broadcast signal is decoded by a decoder. The terminal also includes a second error rate detection unit for detecting a second bit error rate (BER) of the digital broadcast signal after the digital broadcast signal is decoded by the decoder, and a packet error rate detection unit for detecting packet error rate (PER) of the digital broadcast signal. The terminal typically further includes a controller for determining reception quality of the digital broadcast signal based upon a value of the first BER, or the second BER, or the PER. A method for determining signal reception quality includes receiving a digital broadcast signal, detecting the BER, and determining reception quality of the digital broadcast signal based upon a value of the BER.

10 Claims, 5 Drawing Sheets

DIGITAL BROADCASTING RECEIVING TERMINAL WITH RECEPTION QUALITY INDICATOR

CROSS-REFERENCE TO RELATED APPLICATIONS

Pursuant to 35 U.S.C. § 119(a), this application claims the benefit of earlier filing date and right of priority to Korean Application No. 10-2005-0035941, filed on Apr. 29, 2005, the contents of which are hereby incorporated by reference herein in their entirety

BACKGROUND OF THE INVENTION

1. Field of the Invention

The present invention relates to a terminal having a digital broadcast receiver, and more particularly to detecting reception quality of a digital broadcast signal received by such a terminal.

2. Discussion of the Related Art

In a conventional mobile communication terminal, antenna bars are provided on a display to indicate the signal reception level of the terminal based upon the current location of the user. These antenna bars allow a user to recognize whether they can utilize the terminal, or to determine possible call quality, at their current location.

In a digital multimedia broadcast receiving terminal, it is also desirable to provide the user an indication of the reception quality of the received digital broadcast signal. However, there are no existing standards that can accurately provide such information. As such, these types of terminals provide reception quality using different criteria and parameters, which may vary among different manufactures.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a terminal for receiving digital broadcast signals includes a signal receiving component for receiving a digital broadcast signal, and an error rate detection unit for detecting bit error rate (BER) of the digital broadcast signal. The terminal may further include a controller for determining reception quality of the digital broadcast signal based upon a value of the BER.

In one aspect, the terminal may further include a decoder for decoding the digital broadcast signal. The error rate detection unit may be used to detect the BER of the digital broadcast signal before or after the digital broadcast signal is decoded by the decoder. According to one feature, the decoder may include a forward error correction (FEC) decoder, such as a Viterbi decoder or a turbo decoder.

In another aspect, the controller is configured to correlate each of a plurality of reception quality levels with threshold values for the BER, and to determine the reception quality as being one of the plurality of reception quality levels based upon the value of the BER.

In another aspect, the terminal may further include a display for displaying an indicator representing the reception quality.

In yet another aspect, the terminal may also include a satellite digital broadcast receiver, a satellite/terrestrial digital broadcast receiver, or a terrestrial digital broadcast receiver.

If desired, the terminal may be configured to receive digital broadcast signals which are compliant with a particular standard, such as the digital multimedia broadcasting (DMB) standard, the DVB-H standard, or the MediaFlo standard.

In accordance with an alternative embodiment of the present invention, a terminal for receiving digital broadcast signals includes signal receiving components for receiving a digital broadcast signal, and a first error rate detection unit for detecting a first bit error rate (BER) of the digital broadcast signal before the digital broadcast signal is decoded by a decoder. The terminal also includes a second error rate detection unit for detecting a second bit error rate (BER) of the digital broadcast signal after the digital broadcast signal is decoded by the decoder, and a packet error rate detection unit for detecting packet error rate (PER) of the digital broadcast signal. The terminal typically further includes a controller for determining reception quality of the digital broadcast signal based upon a value of the first BER, or the second BER, or the PER.

According to one aspect, the controller may be further configured to compare the PER with a first threshold value, such that if the PER exceeds the first threshold value, then the reception quality is defined as a first quality level. Otherwise, the controller is further configured to compare the first BER with a second threshold value, such that if the first BER exceeds the second threshold value, then the reception quality is defined as a second quality level. Otherwise, the controller is further configured to compare the second BER with a third threshold value, such that if the second BER exceeds the third threshold value, then the reception quality is defined as a third quality level.

In another aspect, the controller is further configured to repeatedly reduce a value of the third threshold value, and each time the value of the third threshold value is reduced, and compare the second BER with the third threshold value. If the second BER exceeds the third threshold value, then the reception quality is defined as a third quality level, such that the third quality level represents the reduced value of the third threshold value.

According to another feature, the first BER, the second BER, and the PER are detected during a predetermined time period (e.g., about 500 ms to about 1 second).

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings.

DETAILED DESCRIPTION OF THIE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or similar parts.

Figure 1:
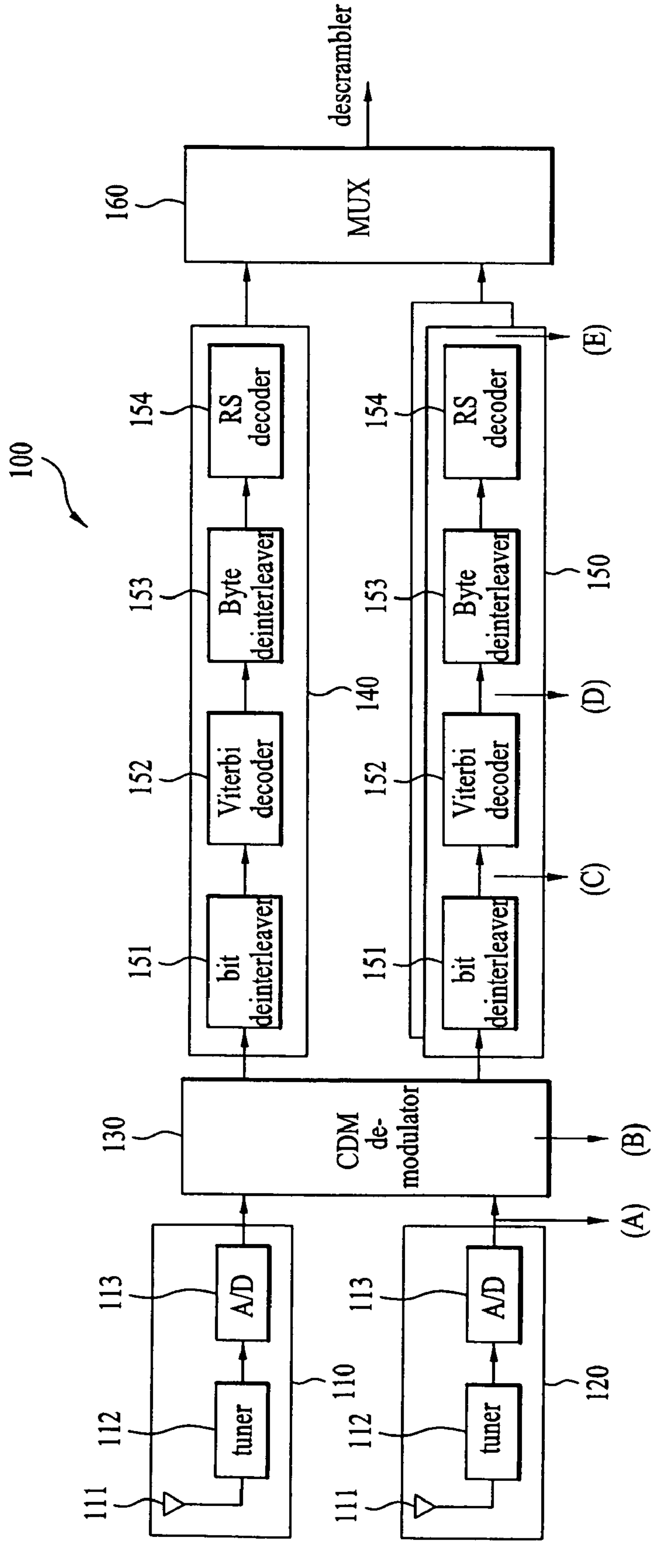
FIG. 1 is a schematic block diagram of a receiver module configured to receive satellite digital broadcast signals.
Figure 2:
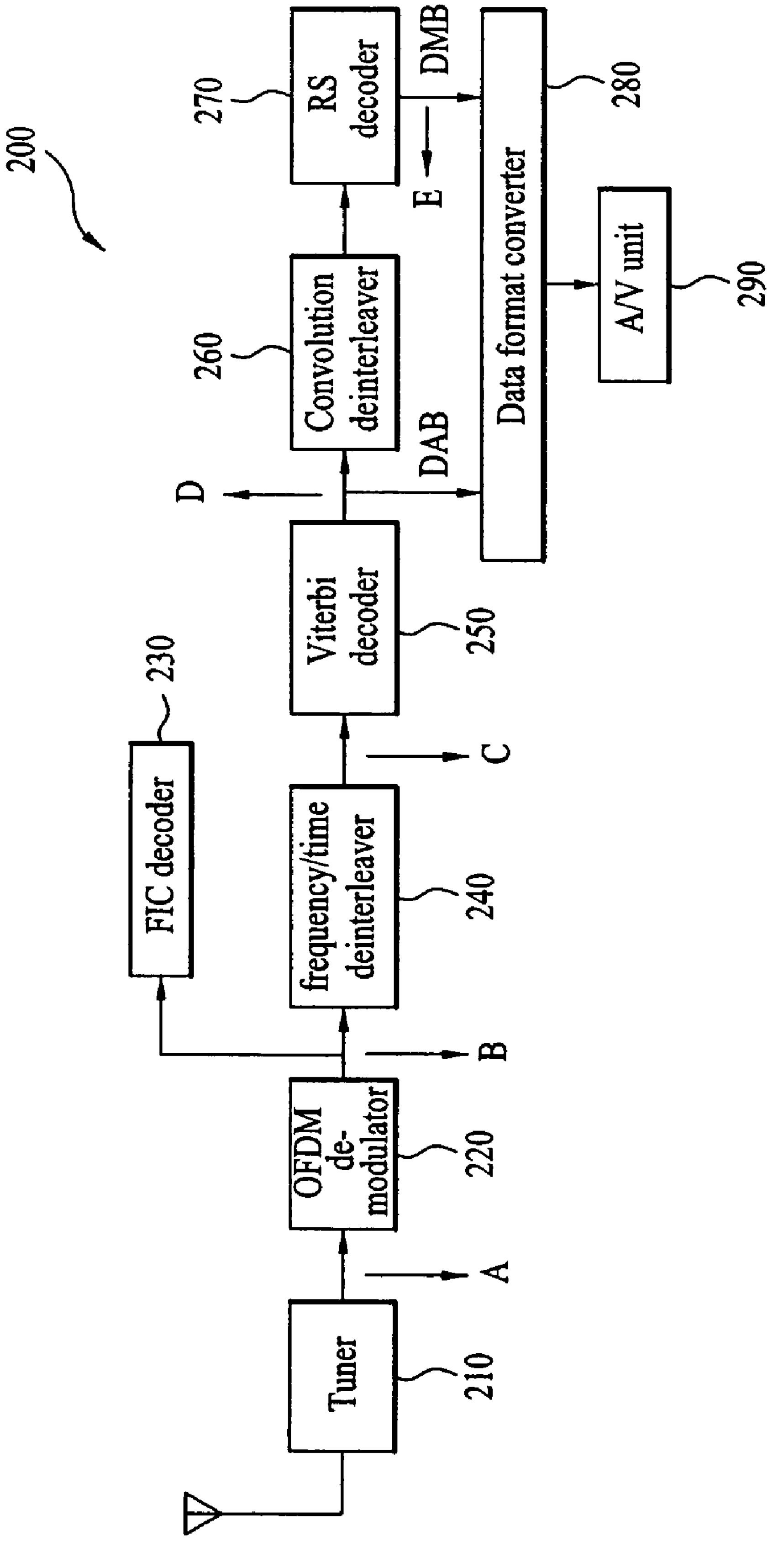
FIG. 2 is a schematic block diagram of a receiver module configured to receive terrestrial digital broadcast signals.

FIG. 1 is a schematic block diagram of receiver module 100 configured to receive satellite digital broadcast signals. In contrast, FIG. 2 is a schematic block diagram of receiving component 200 configured to receive terrestrial digital broadcast signals. These receiving modules form a receiving component of an otherwise conventional mobile terminal. By way of example only, reception quality at the receiving modules of FIGS. 1 and 2 can be measured using information obtained from five separate locations in each terminal.

Although embodiments will be described with reference to a Viterbi decoder utilized in a terminal having a digital broadcast receiver, it is to be appreciated that such description applies equally to other decoders which adopt forward error correction technology. For example, the turbo decoder utilized in the MediaFlo standard is one such decoder. Similarly, the teachings of the present disclosure may also be applied to terminals operating according to the European DVB-H standard. In addition, the digital broadcast receiver of various mobile terminals presented herein may be implemented using a satellite receiver, a terrestrial receiver, or a combination satellite/terrestrial receiver.

FIG. 1 is a block diagram of digital broadcast receiver 100 of a mobile terminal. This receiver is shown configured to receive satellite digital broadcast signals. In this figure, the digital broadcast receiver includes first receiving block 110, second receiving block 120, and code division multiplexing (CDM) demodulator 130 demodulating signals provided from first and second receiving blocks 110 and 120. The broadcast receiver further includes decoding unit 140 for detecting and correcting errors contained in signals received from first receiving block 110, and decoding unit 150 for detecting and correcting errors contained in signals received from second receiving block 120. MUX block 160 is shown multiplexing a signal provided from each of the decoding units 140 and 150, and responsively communicating a signal to a descrambler.

First and second receiving blocks 110 and 120 each include diversity antenna 111, tuner 112, and an analog/digital (A/D) converter 113. Decoding units 140 and 150 each include bit deinterleaver 151, Viterbi decoder 152, byte deinterleaver 153, and Reed-Solomon (RS) decoder 154. In this figure, receiving blocks 110 and 120, and decoding units 140 and 150, are similarly constructed, but differ from each other according to the control signals used to operate these components.

FIG. 2 is a block diagram of digital broadcast receiver 200 configured to receive terrestrial digital broadcast signals. In this figure, receiver 200 includes tuner 210 and orthogonal frequency-division multiplexing (OFDM) demodulator 220, which demodulates signals provided by the tuner. Demodulator 220 provides signaling to fast information channel (FIC) decoder 230 and frequency/time deinterleaver 240. Broadcast receiver 200 further includes Viterbi decoder 250, convolution deinterleaver 260, RS decoder 270, data format converter 280, and A/V unit 290.

The digital broadcast receivers of FIGS. 1 and 2 are shown with five separate reception level measuring points; namely, points A-E. The specifics of each of these points are as follows.

Point A: a point at which a radio frequency (RF) reception level is present. This level is represented by the sum of a desired signal, an undesired interference signal, and noise. At this point, an instantaneous reception level or a reception level for a short time period is usually measured.

Point B: a point at which a reception level associated with Signal-to-Noise Ratio (SNR) can be obtained. The level of an undesired interference signal and noise, relative to a desired signal, can be ascertained. In general, instantaneous reception quality or reception quality for a short time period is measured.

Point C: a point at which a bit error rate (BER) before the Viterbi decoder can be ascertained. The quality of a received bit before Viterbi decoding can also be obtained.

Point D: a point at which the BER after the Viterbi decoder can be obtained. The quality of a received bit after being passed through the Viterbi decoder, which is capable of recovering errors distributed intermittently and at random, can also be obtained.

Point E: a point at which a packet error rate (PER) after a Reed-Solomon decoder can be obtained. The Reed-Solomon decoder recovers data on a packet-by-packet basis, and indicates whether or not one or more errors are present in an individual packet.

In FIGS. 1 and 2, points A and B relate to the reception level of a received digital broadcast signal, and points C, D, and E relate to the reception quality. The relationship among the points C, D, and E may be defined as:

C (BER before Viterbi decoding)>D (BER after Viterbi decoding)>E (PER).

The BER and PER conditions in a typical mobile terminal having a digital broadcast receiver are as follows:

(1) BER after Viterbi decoding is 2*10E-4;

(2) PER is 0.

Figure 3:
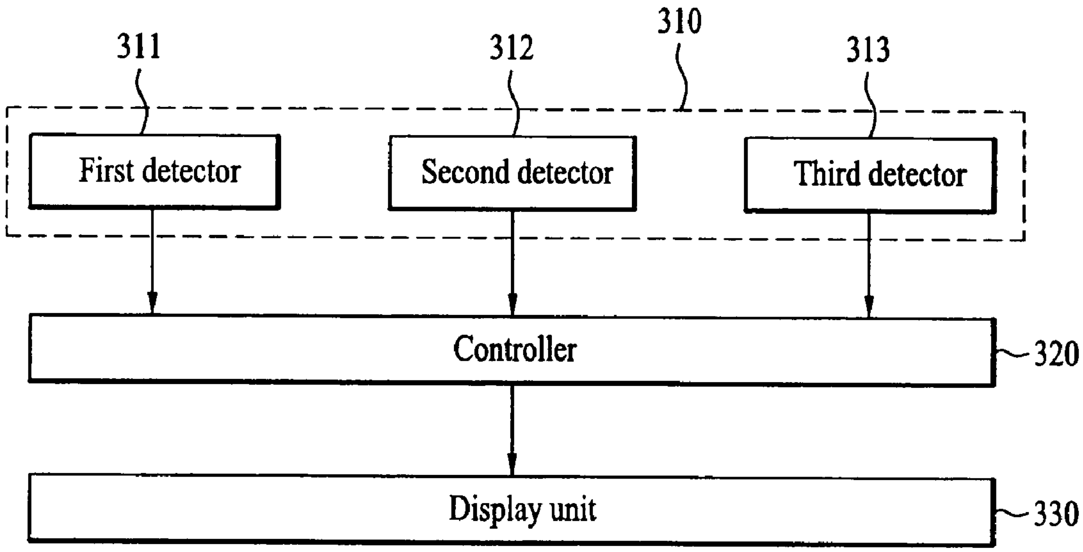
FIG. 3 is a schematic block diagram depicting a reception quality indicator according to an embodiment of the present invention.

FIG. 3 is a schematic block diagram depicting a reception quality indicator according to an embodiment of the present invention. In this figure, the reception quality indicator includes error rate detection unit 310 for detecting packet error rate (PER), and bit error rates (BERs), both before and after a forward error correction (FEC) decoder.

Error rate detection unit 310 is shown having first, second, and third detectors 311, 312, and 313, respectively. First detector 311 may be used for detecting the PER from an output signal from a Reed-Solomon decoder, second detector 312 may be used for detecting the BER before the FEC decoder, and third detector 313 may be used for detecting the BER after the FEC decoder.

The reception quality indicator further includes controller 320. This controller may be configured to compare the PER and BERs, which are detected by error rate detection unit 310, with predetermined threshold values. Reception quality may then be determined according to these comparison results, the specifics of which will be discussed in more detail in conjunction with FIG. 5. Controller 320 outputs a control signal corresponding to reception quality, which is communicated to display unit 330.

Display unit 330 may be configured for displaying an indicator which relates to the user the reception quality of received signals. This indicator is typically generated responsive to a control signal received from controller 320. A user can thus ascertain the reception quality by observing the display unit of the mobile terminal.

Figure 4:
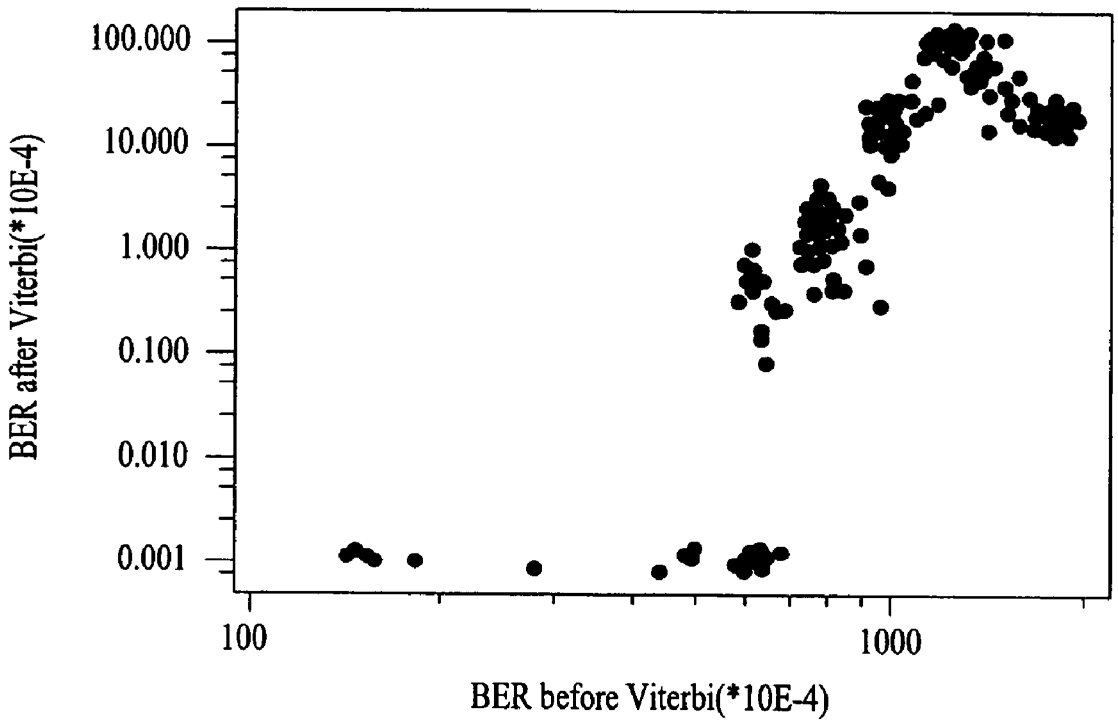
FIG. 4 is a graph depicting the relative relationship between BERs, both before and after Viterbi decoding.

FIG. 4 is a graph depicting the relative relationship between BERs, both before and after Viterbi decoding. In this graph, there is a significant difference between BERs before and after Viterbi decoding. For instance, when BER before Viterbi decoding is 5*10E-2 or less, the BER after Viterbi decoding is close to zero. Viterbi error correction of the BERs causes the illustrated difference between the BERs.

The relationship between BERs after Viterbi decoding and BERs before Viterbi decoding can be expressed by the following:

BER after Viterbi≈100*BER before Viterbi.

Thus, it may be more effective to determine reception quality using BER before Viterbi decoding, rather than after Viterbi decoding, since a higher resolution of data points are possible when using BER before Viterbi decoding.

It is to be understood that accurately determining reception quality using BER after Viterbi decoding is still possible. However, such measurements often require an increased number of actual tests. Increasing the number of tests requires an increased amount of time, which causes a corresponding decrease in overall efficiency. Therefore, in accordance with an embodiment of the present invention, information about reception quality of the terminal is obtained using the BER before Viterbi decoding in order to maximize efficiency of such measurements. However, it is to be understood that terminal reception quality may alternatively be provided based upon BER after Viterbi decoding, or based upon the packet error rate (PER).

Figure 5:
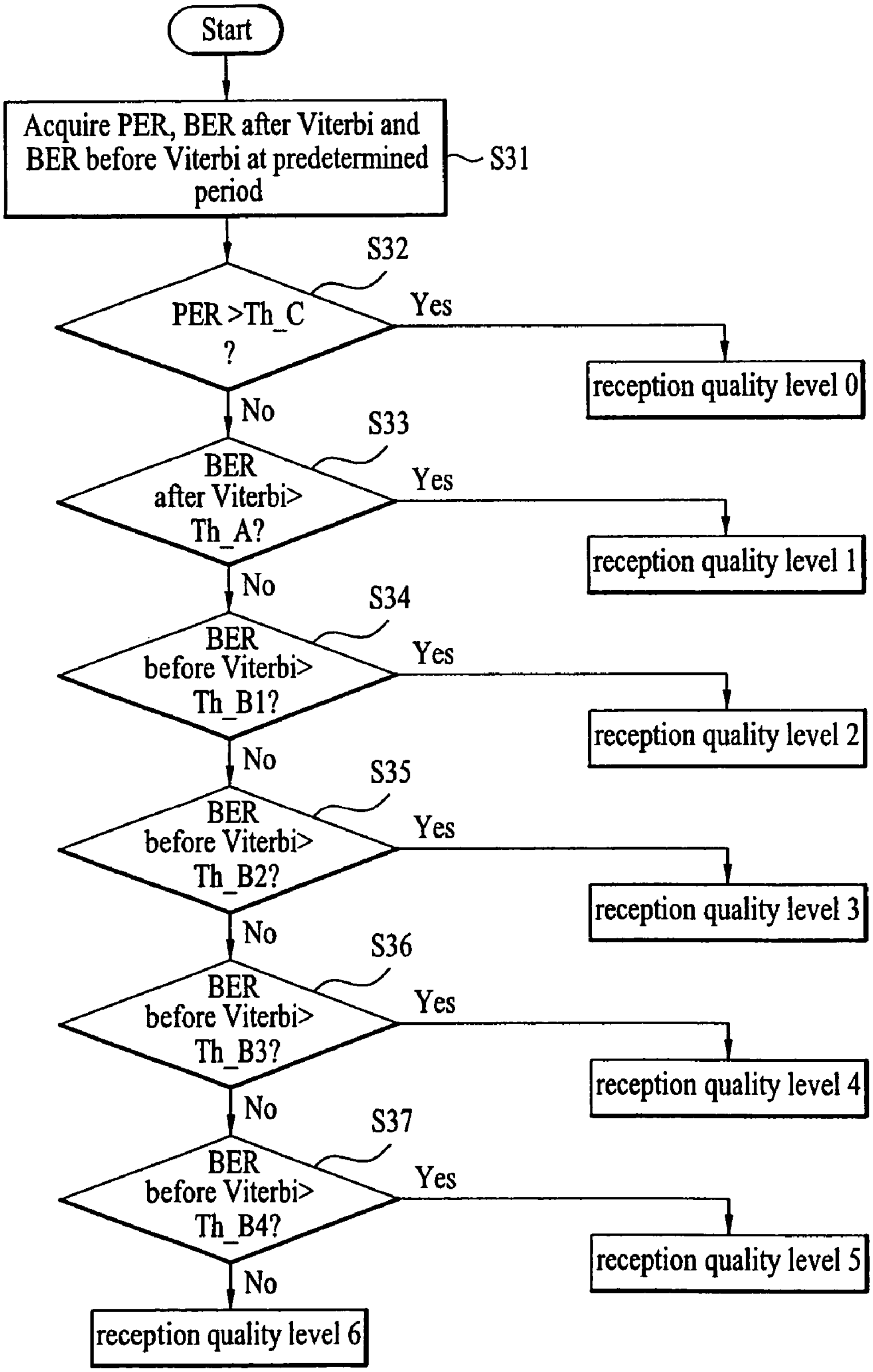
FIG. 5 is a flowchart showing one technique for determining reception quality according to an embodiment of the present invention.

FIG. 5 is a flowchart showing one technique for determining reception quality according to an embodiment of the present invention. In a nonlimiting example, seven distinct reception quality levels may be determined and subsequently displayed or otherwise presented to the user. Reception quality levels may be displayed on a display unit quantitatively in numeric values (e.g., 0-6), using a bar graph, or using any other technique which would convey information relating to the level of reception quality.

Block S31 provides for the acquiring of BERs, both before and after a Viterbi decoder, and a PER from an output signal from a Reed-Solomon decoder, for example. This data may be acquired during a defined time period such as 500 ms-1 sec, for example.

It is generally understood that lower signal levels correspond to lower reception quality. Conversely, higher signals levels correspond to higher reception quality. Situations in which the PER is greater than a predetermined threshold value (Th_C) usually indicate that the received packet is in such a broken or distorted state that it is difficult to interpret. In such a scenario, as indicated in block S32, reception quality may be defined as the lowest level, causing the display of "0," for example.

In another operation, the BER after the Viterbi decoder is compared with a predetermined threshold value (Th_A) (operation S33). If the BER after the Viterbi decoder is greater than the threshold value (Th_A), then it is likely that reception quality is outside the generally desired levels. In such a scenario, the reception quality level is displayed as "1" to indicate that the reception quality is very low.

In accordance with blocks S34-S37, subsequent reception quality level evaluations may be performed using criteria based upon the BER before the Viterbi decoding. These quality levels evaluations are determined using increasing lower threshold levels, such that Th_B1>Th_B2>Th_B3>Th_B4. Reception quality levels 2-6 may therefore be identified based upon the value of the BER before the Viterbi decoding, as provided for in blocks S34-S37.

Although FIG. 5 depicts seven separate reception quality levels, greater or fewer levels may alternatively be used. If desired, block S32 or block S33, or both, may be omitted while still providing sufficiently accurate reception quality determinations. In such an embodiment, PER and BER after Viterbi would not need to be acquired in block S3 1. In accordance with another embodiment, signal quality may be determined using only the necessary operations associated with blocks S31 and S32, thus eliminating the need for blocks S33-S37. Another alternative is to determine signal quality using only the necessary operations associated with blocks S31 and S33, thus eliminating the need for blocks S32, and S34-S37. In yet another embodiment, signal quality may be determined using the necessary operations of blocks S31-S33, thus eliminating the need for blocks S34-S37.

It is to be understood that embodiments of the present invention may be used to provide a reception sensitivity indicator for a terminal having, for example, a digital broadcast receiver. The indicators disclosed herein are capable of providing accurate reception quality information using, for example, a bit error rate before a forward error correction (FEC) decoder.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for determining signal reception quality at a terminal, said method comprising:
- receiving a digital broadcast signal;
- detecting a first bit error rate (BER) of said digital broadcast signal before said digital broadcast signal is decoded by a decoder;
- detecting a second bit error rate (BER) of said digital broadcast signal after said digital broadcast signal is decoded by said decoder;
- detecting packet error rate (PER) of said digital broadcast signal; and
- determining reception quality of said digital broadcast signal based upon a value of said first BER, or said second BER, or said PER.

2. The method according to claim 1, wherein said determining reception quality comprises:
- comparing said packet error rate (PER) with a first threshold value, wherein if said PER exceeds said first threshold value, then said reception quality is defined as a first quality level, otherwise, said determining reception quality further comprises:
- comparing said first bit error rate (BER) with a second threshold value, wherein if said first BER exceeds said second threshold value, then said reception quality is defined as a second quality level, otherwise, said determining reception quality further comprises:
- comparing said second bit error rate (BER) with a third threshold value, wherein if said second BER exceeds said third threshold value, then said reception quality is defined as a third quality level.

3. The method according to claim 2, wherein said determining reception quality further comprises:

repeatedly reducing a value of said third threshold value, and each time said value of said third threshold value is reduced, comparing said second bit error rate (BER) with said third threshold value, wherein if said second BER exceeds said third threshold value, then said reception quality is defined as a third quality level, wherein said third quality level represents said reduced value of said third threshold value.

4. The method according to claim 1, wherein said first bit error rate (BER), said second bit error rate (BER), and said packet error rate (PER) are detected during a predetermined time period.

5. The method according to claim 4, wherein said predetermined time period ranges from about 500 ms to about 1 second.

6. A terminal for receiving digital broadcast signals, said terminal comprising:

a signal receiving component for receiving a digital broadcast signal;

an first error rate detection unit for detecting a first bit error rate (BER) of said digital broadcast signal before said digital broadcast signal is decoded by a decoder;

a second error rate detection unit for detecting a second bit error rate (BER) of said digital broadcast signal after said digital broadcast signal is decoded by said decoder;

a packet error rate detection unit for detecting packet error rate (PER) of said digital broadcast signal; and a controller for determining reception quality of said digital broadcast signal based upon a value of at least one of said first BER, or said second BER, or said PER.

7. The terminal according to claim 6, wherein said controller is further configured to:

compare said packet error rate (PER) with a first threshold value, wherein if said PER exceeds said first threshold value, then said reception quality is defined as a first quality level, otherwise, said controller is further configured to:

compare said first bit error rate (BER) with a second threshold value, wherein if said first BER exceeds said second threshold value, then said reception quality is defined as a second quality level, otherwise, said controller is further configured to:

compare said second bit error rate (BER) with a third threshold value, wherein if said second BER exceeds said third threshold value, then said reception quality is defined as a third quality level.

8. The terminal according to claim 7, wherein said controller is further configured to:

repeatedly reduce a value of said third threshold value, and each time said value of said third threshold value is reduced, compare said second bit error rate (BER) with said third threshold value, wherein if said second BER exceeds said third threshold value, then said reception quality is defined as a third quality level, wherein said third quality level represents said reduced value of said third threshold value.

9. The terminal according to claim 6, wherein said first bit error rate (BER), said second bit error rate (BER), and said packet error rate (PER) are detected during a predetermined time period.

10. The terminal according to claim 9, wherein said predetermined time period ranges from about 500 ms to about 1 second.

* * * * *